United States Patent
Liang

(10) Patent No.: US 8,689,183 B2
(45) Date of Patent: Apr. 1, 2014

(54) SYSTEM AND METHOD FOR EFFECTIVELY PROCESSING SOFTWARE CHANGES

(76) Inventor: Rufeng Liang, San Jose, CA (US)

(*) Notice: Subject to any disclaimer, the term of this patent is extended or adjusted under 35 U.S.C. 154(b) by 492 days.

(21) Appl. No.: 12/924,890

(22) Filed: Oct. 6, 2010

(65) Prior Publication Data

US 2011/0035734 A1 Feb. 10, 2011

Related U.S. Application Data

(63) Continuation-in-part of application No. 12/021,035, filed on Jan. 28, 2008, now abandoned.

(60) Provisional application No. 61/249,558, filed on Oct. 7, 2009.

(51) Int. Cl.
  *G06F 9/44* (2006.01)
(52) U.S. Cl.
  USPC .............................................. 717/120
(58) Field of Classification Search
  None
  See application file for complete search history.

(56) References Cited

U.S. PATENT DOCUMENTS

| 8,312,423 | B1* | 11/2012 | Webb et al. | 717/106 |
| 2004/0194072 | A1* | 9/2004 | Venter | 717/140 |
| 2006/0064677 | A1* | 3/2006 | Bickson et al. | 717/124 |
| 2007/0044066 | A1* | 2/2007 | Meijer et al. | 717/100 |
| 2010/0088669 | A1* | 4/2010 | Cwalina et al. | 717/106 |

OTHER PUBLICATIONS

Ian F. Darwin, "Groovy, Java's New Scripting Language", Sep. 29, 2004, retrieved from http://www.onjava.com/pub/a/onjava/2004/09/29/groovy.html on Mar. 17, 2013.*

* cited by examiner

*Primary Examiner* — Philip Wang
(74) *Attorney, Agent, or Firm* — Bo-In Lin

(57) ABSTRACT

This invention discloses a software development system that includes a user input device, a compiler, a build microprocessor and a data storage. The data storage stores a built program built by the build microprocessor by packaging a plurality of heterogeneous program units comprises at least a binary program-unit processed by the compiler and at least a non-compiled program unit inputted by a user to the built microprocessor through the user input device. The program unit to be compiled into binary program unit and the non-compiled program unit stored in the data storage are programmed by at least two different programming languages.

21 Claims, 6 Drawing Sheets

SYSTEM AND METHOD FOR EFFECTIVELY PROCESSING SOFTWARE CHANGES

This application claims a priority according to a U.S. patent application 61/249,558 filed on Oct. 7, 2009 by the same Applicant of this Application, the benefit of the filing dates are hereby claimed under Title 35 of the United States Code. This Application is a Continuation in Part (CIP) Application of another pending application Ser. No. 12/021,035 filed on Jan. 28, 2008 now abandoned by the Applicant of this invention. The disclosures made in application Ser. No. 12/021,035 are hereby incorporated by reference in this Application.

BACKGROUND OF THE INVENTION

1. Field of the Invention

This invention relates generally to system and method for software development. More particularly, this invention is related to systems and methods for making changes to software programs.

2. Description of the Prior Art

Software development is facing ever increasing requirements of changes in response to changing business and application environments. Providing physical related help like change management system, and process related help like agile development methodologies is not enough since software is composed of logically related entities. Software professionals suffered and companies paid high price for this since existing programming paradigms especially object-oriented programming don't have solution built in for change. In fact object-oriented programming showed incapable of dealing with change efficiently as analyzed below.

Specifically, FIG. 1 illustrates an example of traditional process of creating or modifying and building a program. To create or modify a software program, a programmer interacts with a computer through an input device 102; a source program 104 is then created. After the source program 102 is created, it's sent to a compiler microprocessor 106 for compilation, which results in binary output 108. The binary output 108 is then sent to build microprocessor 110, and the output of 110 is then saved to a storage system 112. Now the program can be copied to any computer or microprocessor for execution. In order to change the software program, according to the conventional processes as now commonly practiced, the programmers have to go through the entire sequence of processes again. However, after many rounds of changes, it is usually unavoidable that the program tends to become bigger with more added applications and improved features. In the meantime, the program becomes more complicated while many modules are interdependent and inter-tangled. For these reasons, the cost of even changing one or few lines of the source code can become very high.

Currently there is no general purpose programming solution or solution at language level in dealing with software changes. There were some efforts towards this problem like design patterns which provides solution for varying part of program for some special cases, frameworks like Struts, Hibernate, which handle some application logic using configuration. These solutions focus on some special cases and can not be scaled for complex applications. The following give some reasons that a general purpose solution using one object-oriented programming language would be almost impossible.

1). Object-oriented program is not cost efficient for change. Object-oriented program tends to use good design to reduce the impact and the number of changes. As software programs are facing more and more changes, the efficient way to deal with change is not to reduce the number of changes, but to reduce the cost of single changes. And we have to predict and treat differently for program areas where changes will most likely to happen since some areas of program may have much bigger chance and higher number of changes than other areas. This is almost impossible to achieve in object-oriented programming which sticks to the principle of treating everything as object, simply and equally.

2). Object-oriented program tends to be bloated due to flexibility-stability dilemma. To deal with change, software program need be stable enough to not collapse on its own weight, and be flexible enough to accommodate frequent changes easily. But stability and flexibility often apply contradictory constraints to one single language, so trade-off must be made in designing language features. This often results in bloated object-oriented program since too many objects are crafted to satisfy the stability requirements or flexibility requirements. Fat programs create more problems for change than lean programs.

3). Object-oriented program can not provide bottom up solution for change. A bottom up solution for software change has tremendous cost advantage over case by case solution like design patterns. Unfortunately, class as a program unit in many object-oriented languages is never designed for such purpose like dealing with change. We can see that the dependency code of a class on some component often spread into different places of the class, which adds difficulty to change dependency in response to change in depended component.

4). Object-oriented program is not scalable for change. To be scalable for change means that the cost of change on a program with multiple components, like 20 components, should not be significantly greater than the multiple times, like 20 times, of the cost of change on program with one component. This is usually not true for object-oriented programs since components of a program are logically related and the relations can grow much faster than components, even uncontrollable, and often result in unexpected cost of change. To be scalable for change, the relations and interactions between components should be well managed. Unfortunately there are no such relation and interaction management in object-oriented programming.

For these four reasons, the object-oriented programming as now commonly applied in software programs has fundamental weakness in managing and processing software changes. This often results in high cost and low productivity when dealing with software changes.

Therefore, an urgent need still exists for those involved in software program development and the management of software changes to structure and develop the software programs by taking into account of the needs for software changes with new layer structures while integrated with suitable languages for software changes such that the above discussed limitations and difficulties can be resolved.

SUMMARY OF THE PRESENT INVENTION

It is therefore one aspect of this invention is to provide an improved platform for developing, compiling and assembling software programs with multiple languages wherein different type of languages are used for developing program modules, components and objects with different degrees of program characteristics depending on future likelihood of software changes. The mixed language programming modules, components and objects are structured as four layers with a stable bottom layer and gradually increased flexibility of changes in the upper layers. The mixed language programming method and software configurations provide convenience and transparency for carrying out program changes. The above discussed technical difficulties and limitations for program changes are therefore resolved.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
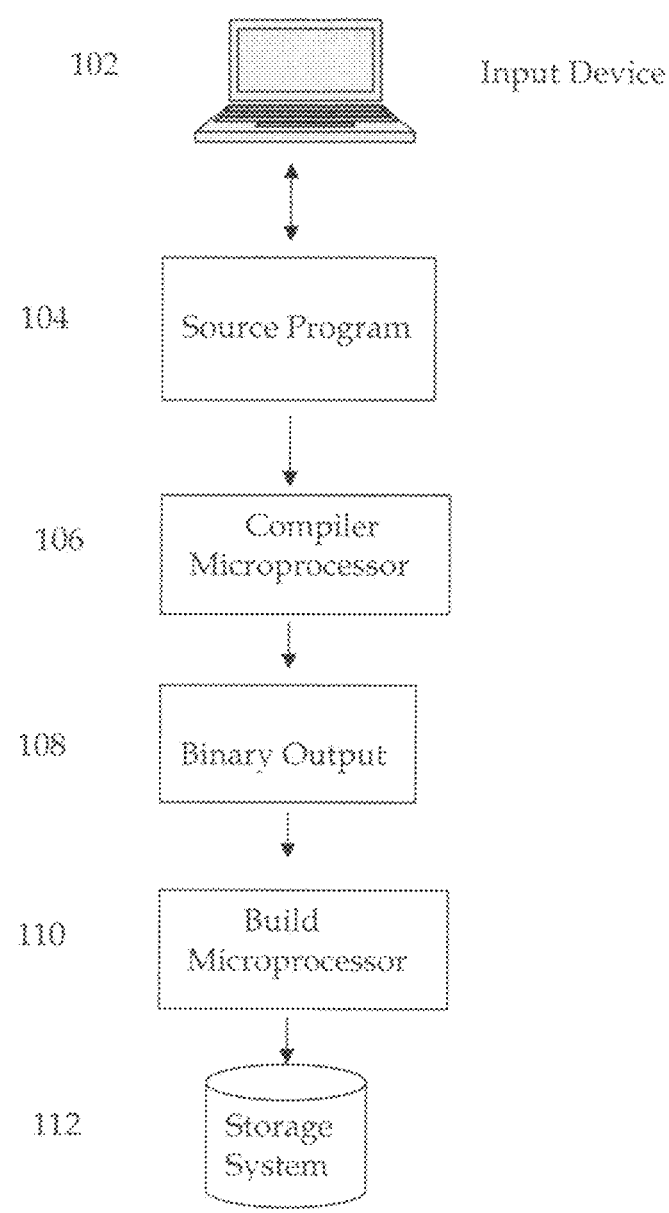
FIG. 1 shows an example of traditional process of creating or modifying a program.
Figure 2:
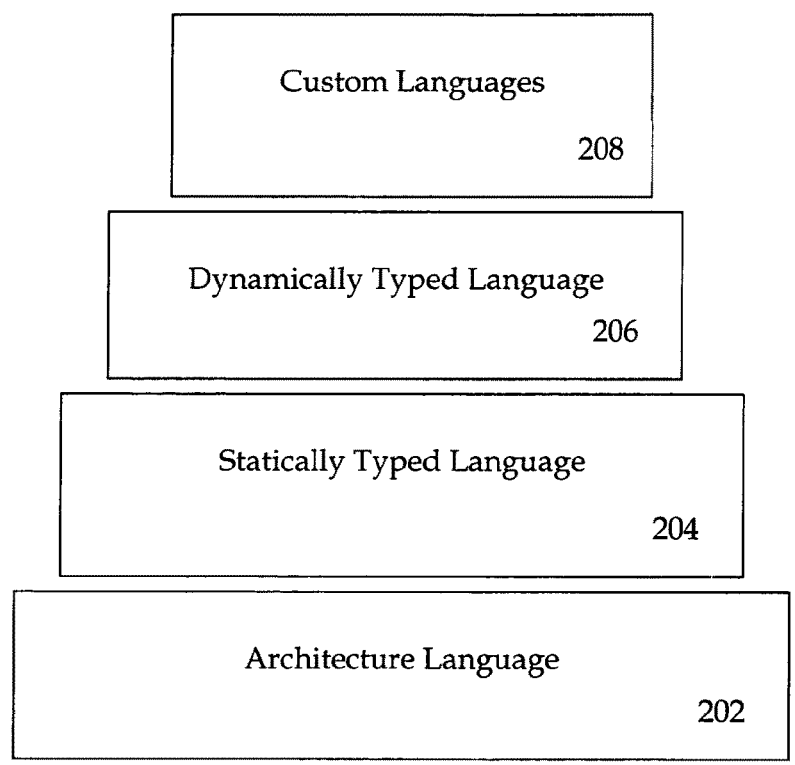
FIG. 2 shows programming languages in layers used in mixed language programming.

FIG. 2 illustrates a layered structure of a software program wherein a software program is programmed and divided into four layers of programming languages according to a mixed language programming process of this invention. A bottom and foundation layer is program with an architecture language 202 for defining the components and their relations and any other constraints for a software program. A second layer on top of the architecture language layer 202 comprises modules and software components programmed by using a statically typed language 204. A third layer 206 comprises software programs programmed by using a dynamically type language to crease dependences of these components. A top layer 208 comprises software programs programmed by using a custom language to define logic or rules based on context created on dynamically typed language 206. Custom languages could be domain specific languages like spreadsheet. One benefit of using these four layers of languages is that any change of programs created by one layer of language would rarely result in changes in programs created using the languages below the layer that is changed.

Specifically, this invention discloses a method of programming dealing with software changes using multiple languages. This mixed language programming involves four types of programming languages. First, the architecture language is used for defining software components and their relations and constraints. Second, the statically typed language is used to define static structure and application interfaces. Third, the dynamically typed language is used to handle to relations and interactions. In this layer, the dynamically typed language may be implemented to externalize the dependency of one class of programs on other component. The relation and interaction can be between one component with other components in the same system, or external components or system. In the fourth layer, the custom languages are used on top of the dynamically type language for contents to be read and written easily. These four types of languages work together like four layers, each layer provides foundation for the next layer language program. Architecture language is used to provide components definition so that statically typed language can be used to program implementation of these components. Statically typed language can be used to provide components so that dynamically typed language can be used to program relations and interaction of existing component with other components, or external components or systems. Dynamically typed language can be used to provide program base so that custom languages can be used to write content on top of the program. The mixing is done at the program unit, in most cases, one class of programs may often be built including a heterogeneous unit. The class structure can be implemented in statically typed language, dependency on other components can be implemented in dynamically typed language, and custom languages can be used inside the dependency program to provide useful content easy to read and write.

Figure 3:
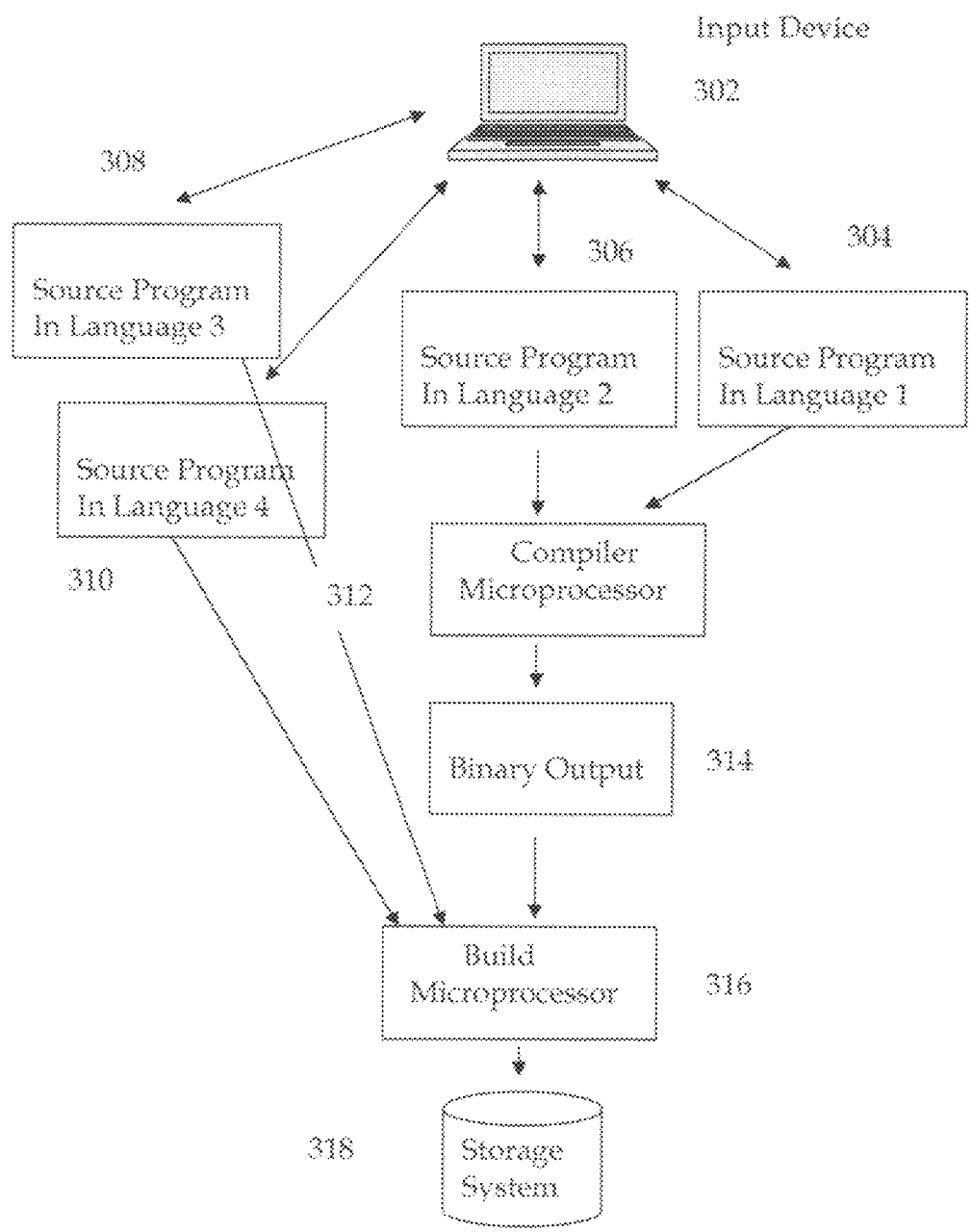
FIG. 3 shows an example of the process of creating or modifying a program in mixed language programming approach in accordance with an embodiment of the invention.

FIG. 3 illustrates an example of process of creating or modifying and building a program based on the invention. To create or modify a software program in mixed languages as defined in the invention, a programmer interacts with a computer through an input device 302. The programming process is different than the conventional approach because the software program components are written in different languages according to the likelihood of future changes and structured as four layers as shown in FIG. 2. Specifically, the program 304 is written in a first language, the source program 306 is written in second language, the source program 308 is written in third language, and the source program 310 is written in fourth language. Then program 302 and 304 are sent to a compiler microprocessor 312 for compilation, which results in binary output 314. The binary output 314 and source program 308 and source program 310 are then sent to a build microprocessor 316 to package together, then the output of 316 is then saved to storage system 318. Now the program can be copied to any computer or microprocessor for execution. The change processes for changing the software program developed according to the processes illustrated in FIG. 3 is significantly simplified because the software changes made to programs 308 written in the third language and source program 310 written in the fourth in language no longer require the software-compilation process carried out by compiler microprocessor 312. The software change processes are therefore simplified and can be accomplished with reduced cost.

Figure 4:
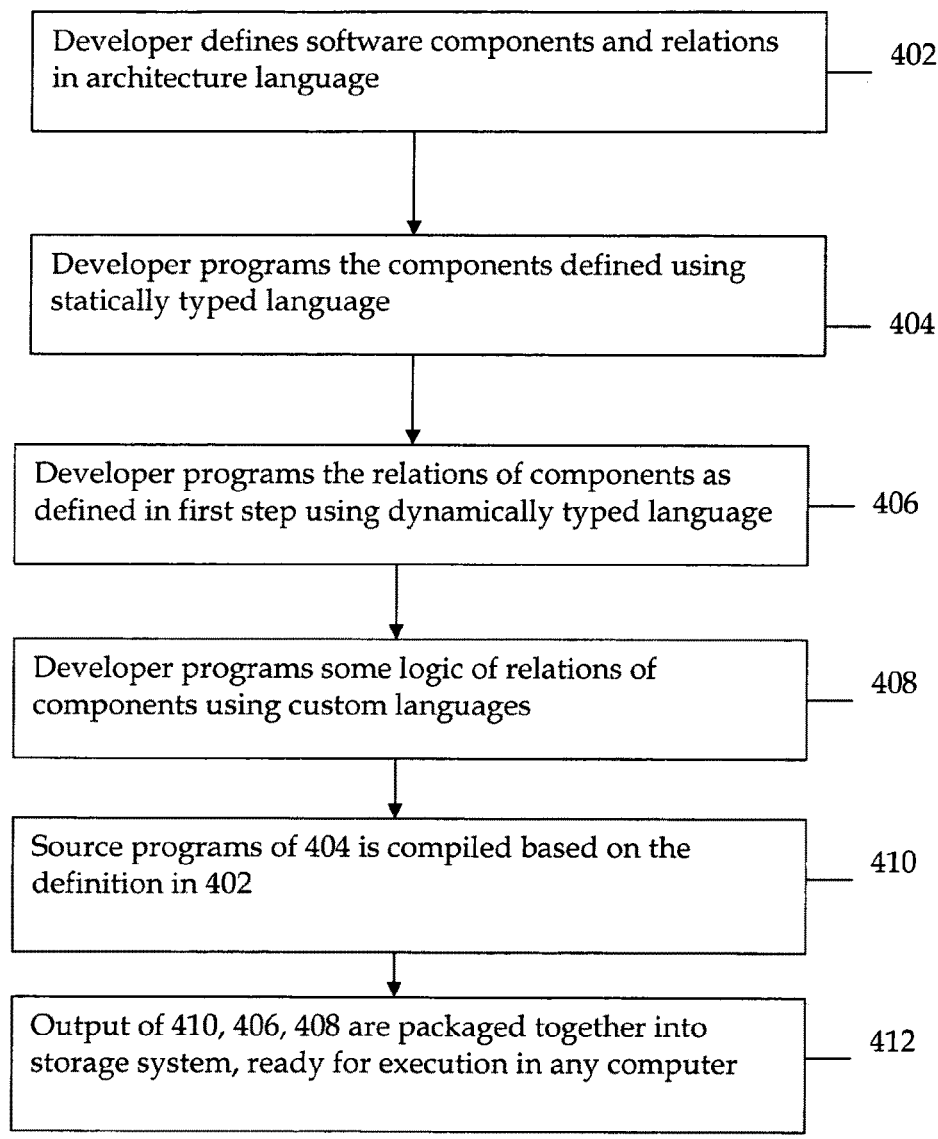
FIG. 4 shows a flowchart of a process of creating or modifying a program in mixed language programming approach in accordance with an embodiment of the invention.

FIG. 4 is a flow diagram for illustrating an example of processes for creating a program in mix language programming of this invention. The first step 402 is a process that defines the software components and relations in architecture language, which could some languages like XML, or languages for describing component diagrams. The second step 404 includes the processes of programming components as defined in 402 using statically typed language like Java or C#. The third step 406 is the processes of programming component relations using dynamically typed language like Ruby, Groovy. The forth step 408 includes processes of programming some logic of component relations using custom languages such as Excel. The processes of programming proceed with a step 410 of compiling the source programs created in 404 using definition created in 402 and then in step 412 the output of 410 and 406, 408 are packaged together and ready for execution. The processes as shown is only one example of developing a program with mixed languages and the order may be flexibly changed depending on particular programs and specific applications of these programs. After the mixed language programs are generated following the processes for mixed language programming, the processes of changing the source programs as created in the third step 406 and the forth step 408 become much easier since no compilation is needed, and the scopes and the impact of changes are therefore less likely to propagate, particularly very unlike to propagate to program components at layers below the layers developed in steps 406 and 408.

Figure 5:
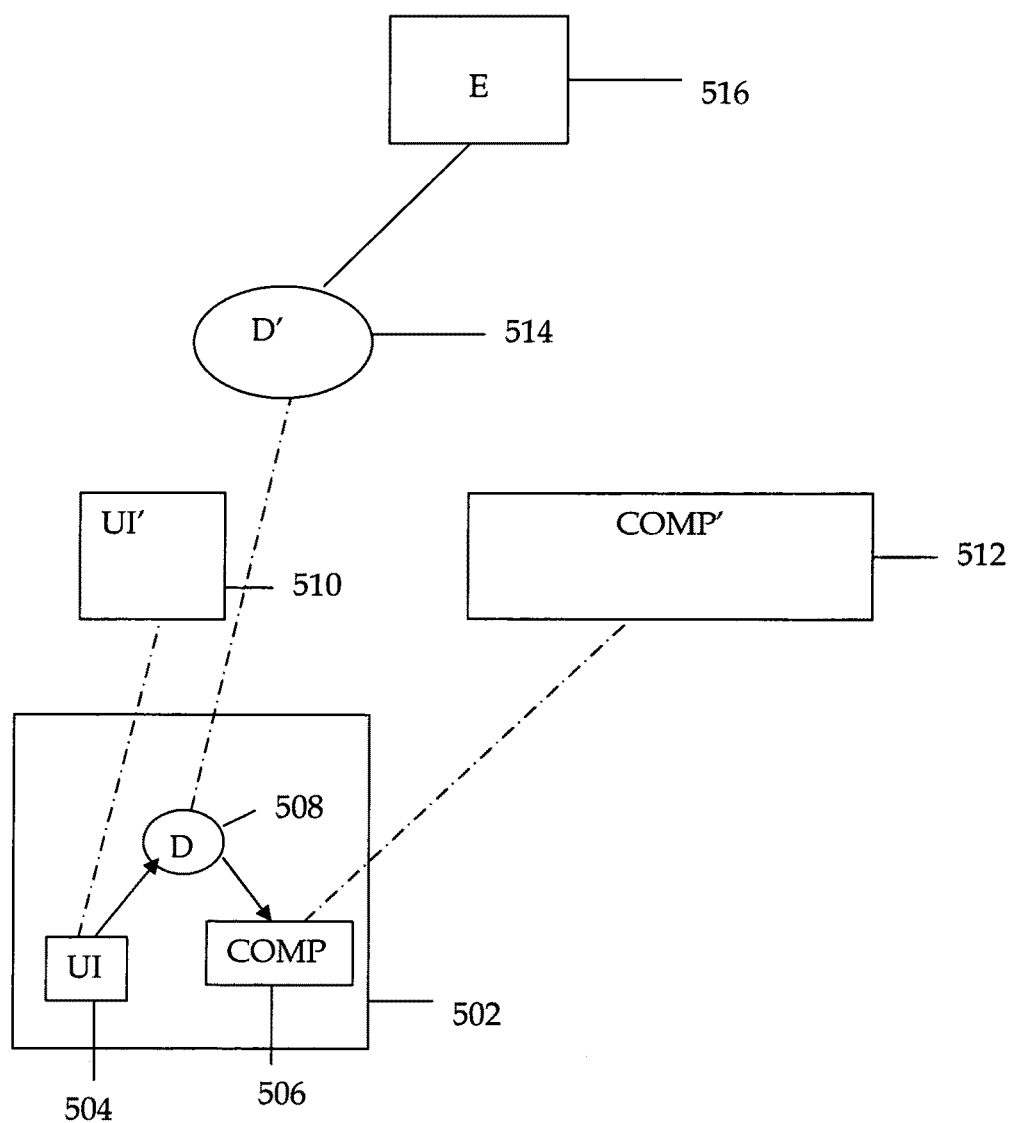
FIG. 5 shows an example of components of a system programmed in mixed language programming in accordance with an embodiment of the invention.

FIG. 5 shows an example of the software components generated according to the steps shown in FIG. 4 with a layer structure shown in FIG. 2 of this invention. Changes made to the program developed with method and layer structure of this invention can be accomplished with simplified processes and become much easier. As shown in FIG. 5, the necessary changes as required for making the changes are easier to locate and complete in a software project 502 as illustrated in the diagram that includes the software components UI 504, COMP 506, and their relation D 508 of the software project. As shown in FIG. 5, the software component UI 504 depends on the software component D 508 and the software component D 508 depends on the software component COMP 506 and all these three components are clearly and specifically defined in the program component 502 that defines the overall architectural organization of program components and does not include real implementations as that are programmed in the specific components. The software components UI' 510 and COMP" 512 could be program written in Java as the realization of the program components UI 504 and COMP 506. The program component D' 514 could be written as a Groovy program that implements the relation D 508 and the software component E 516 includes logic of D' 514 could be written in Excel.

Figure 6:
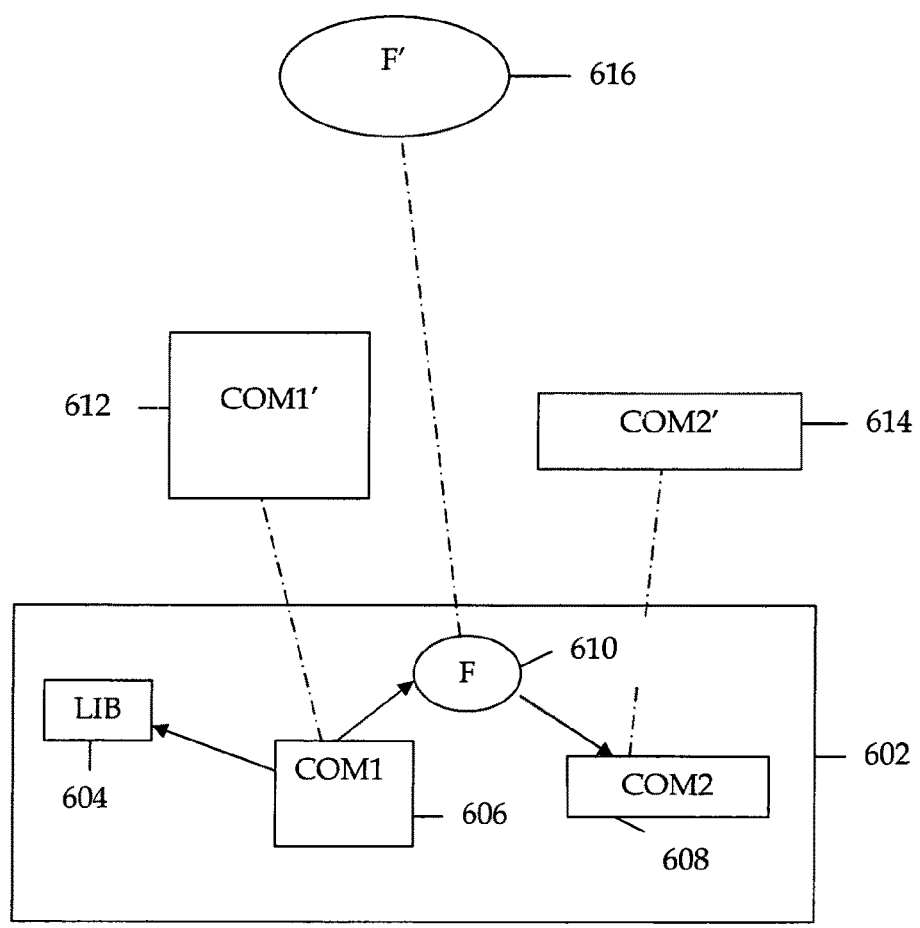
FIG. 6 shows an example of components of a system programmed in mixed language programming in accordance with an embodiment of the invention.

FIG. 6 is another example for illustrating the inter-relationships between software components programmed with mixed languages and structured as a program of three layers according to the method and software configuration of this invention. The program components in layer 602 could be a XML diagram that defines software components COM1 606 and COM2 608 and their relation F 610 in the software project. As shown in FIG. 6, COM1 depends on an external library LIB 604, and F 610, F 610 depends on COM2 608. COM1' 612 and COM2' 614 could be program written in C# as a realization of COM1 606 and COM2 608. F' 616 could be written in IronRuby that implements the relation F 610. In this embodiment, there is no program defined in custom languages.

As shown in FIGS. 2 to 6, the programs developed in this invention uses mixed language programming method and system to deal with software change. The dependency externalization and heterogeneous unit are keys to the advantages over object-oriented programming method. The problems mentioned in the above four reasons as previously discussed according to the conventional object-oriented programming techniques can be solved by this invention.

1). Mixed language program can be organized in a cost efficient way for change. As we analyzed before, the key to reduce cost of changes is not to reduce number of changes but to reduce the cost of single changes. Mixed language program can help to reduce the cost of single changes. The statically typed language is used for structure and interfaces which are supposed to not change frequently although the cost of change in statically typed language program is high. The dynamically typed language is used for relation and interaction, which can be changed much easier since they don't need compile in most cases, and have little impact on structure, and have impact on minimal number of components. The custom languages can be used for contents that are easy to understand, and modify and sometime even by even non-programmers.

2). Mixed language program can be created with maximal flexibility and stability. Since mixed language program uses multiple languages, different languages can take different constraints by stability requirements and flexibility requirements. Different languages have different stability and flexibility, and on the average mixed language program can achieve maximal stability and maximal flexibility than single language program.

3). Mixed language program can handle changes bottom-up. Bottom up approach to handle changes is a generic, easy and simple, low cost approach to handle changes. This can be solved using heterogeneous unit in mixed language programming. Heterogeneous unit in most cases means class that is composed of implementation using more than one language. In this invention, statically typed language defines the structure for a class, dynamically typed language defines dependency on other components, and custom languages can be used to extract some content on top of dynamically typed language.

4). Mixed language program is scalable for change. Software program is composed of components and relations. If relations are well managed, then program can be scaled to complex program. The relations and interactions are well managed from both the high level through architecture language, and low level through heterogeneous unit in the mixed language programming. So mixed language program is scalable for change.

Therefore, the mixed language programming has advantages over object-oriented programming in dealing with change: lean structure, easy to modify, and easy to evolve, which can be translated into lower cost in software development and also maintenance.

As an example, in order to develop a program that has two software components: X and Y. The method to develop the software is similar to traditional software development with some differences. The following are the steps:

1. Define two components X and Y, and their relation XY (X depends on Y) using architecture language like component diagram.
2. Create and develop classes for component X and Y using statically typed language, and also define the functions of classes in X to be implemented by dependency code created in next step.
3. Implement the required dependency code for classes in X using dynamically typed language.
4. If needed, use some custom languages like XML to express some content in program in 3, and create the code to integrate the content together using the language in 3.
5. Build the difference programs created in 2, 3, 4 together by invoking some function of the system.

The system that helps to build different program in different languages can be implemented in the following steps:

1. The system will load the program that defines components and relations, and use it to enforce the relations and other constraints.
2. The system will also build programs of different languages together.

The step 3 in first process and step 2 in second process can be implemented using method based on pending U.S. patent application Ser. No. 12/021,035: "Method and Apparatus for Managing Software Component Dependencies" and the disclosures made in U.S. patent application Ser. No. 12/021,035 are hereby incorporated by reference in this Patent Application.

According to above descriptions, the process to build a program with two components X and Y can be summarized by the processes as described below. First, the component X and Y are defined with their relation defined as XY for indicating that X depends on Y by a component diagram. Then, classes are developed to implement X and Y using statically typed language, for example, Java, with one class X.C in X has dependency on Y. Then, the dependency is implemented in a dynamically typed language, for example, Groovy. The processes followed by extracting some content in some languages, for example, XML format from the Groovy code as a way to express some logic or as a way of configuration. Finally the software components developed in the above processes are built together to produce the final program. In these processes, the architecture language could be some language for describing component diagrams, the statically typed language could be Java, C#, the dynamically typed language could be Groovy, Ruby, or Python, and the custom languages could be XML, Excel, or simply name value pairs.

According to above descriptions and FIGS. 2 to 6 this invention discloses a data handling system for software development. The data handling system now applied specifically as a software development system includes a user input device 302, a compiler 322, a build microprocessor 316 and a data storage 318. The data storage 318 stores a built program built by the build microprocessor by packaging a plurality of heterogeneous program units comprising at least a binary program-unit processed by the compiler 312 and at least a non-compiled program unit, e.g., source programs 308 and 310, inputted by a user to the built microprocessor 316 through the user input device 302. In an embodiment, the program unit, e.g., the source program 316 to be compiled, and the non-compiled program unit stored in the data storage 318 are programmed by at least two different programming languages. In another embodiment, the non-compiled program unit stored in the data storage further includes a dynamically typed language program unit and a custom language program unit, such as that inputted through the source programs 308 and 310 and shown as program units programmed with dynamically typed language 206 and custom language 208 shown in FIG. 2. In another embodiment, the compiler 312 further receives source program 304 written in an architecture language program, i.e., program units programmed with an architecture language 202 shown in FIG. 2, for compiling a source program 306 written in a statically typed language to generate the binary program unit 314. In another embodiment, the non-compiled program unit stored in the data storage further includes a dynamically typed language program unit, e.g., program units 308 shown in FIGS. 3 and 206 shown in FIG. 2, written in an IronRuby language. In another embodiment, the non-compiled program unit stored in the data storage further includes a custom language program unit, e.g., the program unit 310 shown in FIGS. 3 and 208 shown in FIG. 2, written in an Excel language. In another embodiment, the non-compiled program unit stored in the data storage further includes a dynamically typed language program unit written in a Groovy language. In another embodiment, the non-compiled program unit stored in the data storage further includes a custom language program unit, e.g., program unit E 516 shown in FIG. 5, written in a XML language. In another embodiment, the compiler further receives a source program written in an architecture language XML program for compiling a source program written in a C# language to generate the binary program unit. In another embodiment, the compiler further receives a source program written in an architecture language XML program for compiling a source program written in a Java language to generate the binary program unit.

This invention further discloses a method of generating a software program for storing in a data storage in a software development system. The method includes a step with a user writes and inputs a plurality of source programs in at least two different programming languages through an input device 302 and compiling the source programs written in at least one of the different programming languages to generate binary program units 314 and then building an executable program for storing in the data storage 318 by packaging the binary program units 314 with the source programs 308 and 310 written in another of the different programming language as non-compiled program units. In another embodiment, the step of the user writes and inputs a plurality of source programs further comprising the user writes a source program in an architecture language through the input device for inputting to and applied by a compiler of the software development system for compiling the source programs written in at least one of the different programming languages. In another embodiment, the step of the user writes and inputs a plurality of source programs further comprising the user writes a source program in a XML language as an architecture language through the input device for inputting to and applied by a compiler of the software development system for compiling the source programs written in at least one of the different programming languages. In another embodiment, the step of the user writes and inputs a plurality of source programs further comprising the user writes a source program in a statically typed language through the input device for inputting to a compiler of the software development system for compiling the source programs to generate the binary program units. In another embodiment, the step of the user writes and inputs a plurality of source programs further comprising the user writes a source program in a C# language as a statically typed language through the input device for inputting to a compiler of the software development system for compiling the source programs to generate the binary program units. In another embodiment, the step of the user writes and inputs a plurality of source programs further comprising the user writes a source program in a Java language as a statically typed language through the input device for inputting to a compiler of the software development system for compiling the source programs to generate the binary program units. In another embodiment, the step of the user writes and inputs a plurality of source programs further comprising the user writes a source program in a dynamically typed language through the input device for inputting to a build microprocessor of the software development system as the non-compiled program units. In another embodiment, the step of the user writes and inputs a plurality of source programs further comprising the user writes a source program in an IronRuby language as a dynamically typed language through the input device for inputting to a build microprocessor of the software development system as the non-compiled program units for building and packaging into the executable program. In another embodiment, the step of the user writes and inputs a plurality of source programs further comprising the user writes a source program in a Groovy language as a dynamically typed language through the input device for inputting to a build microprocessor of the software development system as the non-compiled program units for building and packaging into the executable program. In another embodiment, the step of the user writes and inputs a plurality of source programs further comprising the user writes a source program in a custom language through the input device for inputting to a build microprocessor of the software development system as the non-compiled program units for building and packaging into the executable program. In another embodiment, the step of the user writes and inputs a plurality of source programs further comprising the user writes a source program in an Excel language as a custom language through the input device for inputting to a build microprocessor of the software development system as the non-compiled program units for building and packaging into the executable program. In another embodiment, the step of the user writes and inputs a plurality of source programs further comprising the user writes a source program in a XML language as a custom language through the input device for inputting to a build microprocessor of the software development system as the non-compiled program units for building and packaging into the executable program.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A software development system comprising:
   a user input device, a compiler, a build microprocessor and a data storage;
   the data storage stores a built program built by said build microprocessor by packaging a plurality of program units comprising at least a binary program-unit processed by said compiler and at least a non-compiled program unit inputted by a user to the built microprocessor through the user input device wherein the program units comprise at least a first level program unit and a separated second level program unit wherein the first level program unit is programmed in an architecture type programming language as a first level programming language and the second level program unit is programmed in a statically programming language as a second level programming language and wherein the second level program unit is developed depending on the first level program unit; and
   wherein the first level program unit is not required to change when changes are made to the second level program unit.

2. The software development system of claim 1 wherein:
   the program units further comprising program units of a third level programmed in a dynamically typed language and program units of a forth level programmed in a custom language.

3. The software development system of claim 1 wherein:
   the compiler further receives source programs of the first level programming units and the second level programming units to generate the binary program units.

4. The software development system of claim 1 wherein:
   the program units further comprising program units of a third level programmed in a dynamically typed language written in an IronRuby language.

5. The software development system of claim 1 wherein:
   the program units further comprising program units of a forth level programmed in a custom language written in an Excel language.

6. The software development system of claim 1 wherein:
   the program units further comprising program units of a third level programmed in a dynamically typed language written in a Groovy language.

7. The software development system of claim 6 wherein:
   the program units further comprising program units of a forth level programmed in a custom language written in a XML language.

8. The software development system of claim 1 wherein:
   the compiler further receives source programs of the second level programming units programmed in the second level programming language written in a C# language, and programs of the first level programming units programmed in the first level programming language written in an architecture XML language, to generate the binary program units.

9. The software development system of claim 1 wherein:
   the compiler further receives source programs of the second level programming units programmed in the second level programming language written in a Java language, and programs of the first level programming units programmed in the first level programming language written in an architecture XML language, to generate the binary program units.

10. A method of generating and changing a software program for storing in a data storage in a software development system comprising:
    a user writes and inputs a plurality of source programs in at least two different programming languages through an input device and compiling the source programs written in at least one of said different programming languages to generate binary program units and then building an executable program for storing in said data storage by packaging said binary program units with the source programs written in another of said different programming language as non-compiled program units wherein the plurality of source programs comprise at least a first level programming units programmed in an architecture type programming language as a first level programming language and a separate second level program units and the second level program unit is programmed in a statically programming language as a second level programming language respectively;
    developing the second level programming units depending on the first level programming units; and
    making changes to the second level programming units without changing the first level programming units.

11. The method of claim 10 wherein:
    said step of the user writes and inputs a plurality of source programs further comprising the user writes a source program of the first level programming units in an architecture language as the first level programming language.

12. The method of claim 10 wherein:
    said step of the user writes and inputs a plurality of source programs further comprising the user writes a source program of the first level programming units using the first level programming language in a XML language as an architecture language.

13. The method of claim 10 wherein:
    said step of the user writes and inputs a plurality of source programs further comprising the user writes a source program of the second level programming units in a statically typed language as the second level programming language.

14. The method of claim 10 wherein:
said step of the user writes and inputs a plurality of source programs further comprising the user writes a source program of a the second level programming units in a C# language as a statically typed language.

15. The method of claim 10 wherein:
said step of the user writes and inputs a plurality of source programs further comprising the user writes a source program of the second level programming units in a Java language as a statically typed language.

16. The method of claim 10 wherein:
said step of the user writes and inputs a plurality of source programs further comprising the user writes a source program of a third level programming unit using a third level programming language in a dynamically typed language.

17. The method of claim 10 wherein:
said step of the user writes and inputs a plurality of source programs further comprising the user writes a source program of a third level programming unit using a third level programming language in an IronRuby language as a dynamically typed language.

18. The method of claim 10 wherein:
said step of the user writes and inputs a plurality of source programs further comprising the user writes a source program of a third level programming unit using a third level programming language in a Groovy language as a dynamically typed language.

19. The method of claim 10 wherein:
said step of the user writes and inputs a plurality of source programs further comprising the user writes a source program of a forth level programming unit in a custom programming language as a forth level programming language.

20. The method of claim 10 wherein:
said step of the user writes and inputs a plurality of source programs further comprising the user writes a source program of a forth level programming unit using an Excel language as a forth level programming language.

21. The method of claim 10 wherein:
said step of the user writes and inputs a plurality of source programs further comprising the user writes a source program of a forth level programming unit using a XML language as a forth level programming language.

* * * * *